United States Patent [19]

Elliott, Jr. et al.

[11] Patent Number: 5,128,382
[45] Date of Patent: Jul. 7, 1992

[54] MICROCELLULAR FOAMS

[75] Inventors: Jarrell R. Elliott, Jr., Northfield Center; Gokul Srinivasan; Manish Dhanuka, both of Akron; Ranjan Akhaury, Akron, all of Ohio

[73] Assignee: The University of Akron, Akron, Ohio

[21] Appl. No.: 794,124

[22] Filed: Nov. 15, 1991

[51] Int. Cl.$^5$ ................................................ C08J 9/20
[52] U.S. Cl. ..................................... 521/178; 521/56; 521/149; 521/150; 521/64
[58] Field of Search .................. 521/178, 149, 150, 56, 521/64

[56] References Cited

U.S. PATENT DOCUMENTS 4,873,218  10/1991  Pekala ................................. 502/418
4,997,804   3/1991  Pekala ................................. 502/418

OTHER PUBLICATIONS

Aubert, Sylwester—"Microcellular Foams? For What?"Chemtech—Apr. 1991 pp. 234-238.
Teichner—"Aerogels"—Chemtech—Jun. 1991 pp. 373-377.
Elliott—"Microcellular methacrylates . . . " Polymer Communications—1991 vol. 32, pp. 10-12.
Gokul Srinivasan—J. Richard Elliott, Jr. "Microcellular Materials via Polymerization in Supercriticl Fluids", Nov. 15, 1990 pp. 1-22 prepared for 1990 Aiche National Meeting, Chicago, Ill.

*Primary Examiner*—Morton Foelak
*Attorney, Agent, or Firm*—Oldham, Oldham & Wilson Company

[57] ABSTRACT

Supercritical drying has distinct advantages in generating microcellular materials. The dimensional stability of the polymer is not affected on drying because the supercritical process does not go through the two phase path and therefore the effect of capillary forces is absent. This helps in maintaining the morphology of the final polymer structure and better control over cell size.

Organic microcellular foams were prepared by polymerizing directly in a near-critical fluid and pursuing the supercritical drying in the same reactor. The critical variables are the choice of a diluent with a strong enough solvent power to stabilize the polymer matrix, but with a low enough critical temperature to permit critical point drying without damage to the polymer matrix.

29 Claims, 8 Drawing Sheets

MICROCELLULAR FOAMS

TECHNICAL FIELD

This invention relates to the preparation of microcellular copolymer foams by supercritical fluid processing or near-critical diluent processing.

BACKGROUND OF THE INVENTION

Polymer foams are materials made by generating void spaces inside a bulk polymer, resulting in substantially reduced density. When these void spaces are interconnected, the material is characterized as open-celled. If these voids are discrete and not connected, the material is characterized as closed-celled. The nature of these cells and the cell size determine many properties of the polymer. For example, light weight and low thermal conductivity are the typical properties of a conventional foam. The density of conventional styrofoam is in the range of 0.02-0.2 g/cm$^3$ with closed cells between 50-100 μm in diameter.

When the cell size is less than 10 μm, the foams are referred to as microcellular foams. Several remarkable properties have been noted for microcellular foams. First the strength/weight ratio for a closed-cell microcellular foam has been shown to be 5-6 times higher than for a macrocellular foam. Second, the high pore volume and high surface area of open-celled aerogels suggest applications as catalyst supports. The variability of the cell size and surface chemistry suggest novel applications as membranes or controlled release supports. Finally, when cell sizes are smaller than 0.040 μm, the materials become transparent while retaining their low densities (0.05-0.10 g/cm$^3$) and relatively low thermal conductivities.

The key to making a microcellular foam is to focus on the mode of phase separation. Phase separation in conventional foaming occurs when the bubble forms and inflates in a manner that is difficult to control resulting in non-uniform foams. Synthesizing a microcellular foam requires gaining significantly greater control over the phase separation process. The method by which the lowest densities and smallest pore sizes have been obtained is reaction induced phase separation with critical point drying. Critical point drying was first applied to foam drying of aerogels, and subsequently applied to an organic resorcinol-formaldehyde foam.

Probably the most versatile preparation technique involves thermally induced phase separation (TIPS) of polymer solutions. In this technique, a polymer solution is quenched in order to induce phase separation, either through liquid-liquid phase separation or polymer crystallization.

When the TIPS process results in the formation of a continuous polymer-rich phase, two additional processing steps can lead to a microcellular foam. First, the morphology of the phase-separated solution is preserved either through vitrification or crystallization of the polymer. This step preserves the small-scale morphology of the demixed solution. Next, the solvent is removed through freeze-drying or supercritical extraction.

The TIPS process is a general method whose primary requirement is polymer solubility. Low-density microcellular foams have been prepared with TIPS using many different polymers, including atactic polystyrene, isotactic polystyrene, poly(4-methyl-1-pentene), poly-acrylonitrile, and water-soluble polymers such as (carboxymethyl)cellulose, poly(acrylic acid) and dextran.

One significant limitation of the commercially viable processes is that pores are produced that are generally closed-celled and poorly controlled in pore size and morphology.

SUMMARY OF THE INVENTION

This invention relates to the preparation of microcellular copolymer foams by supercritical fluid processing or near-critical diluent processing.

It is a first object of this invention to synthesize a microcellular epoxy-based copolymer foam of bisphenol-A/tetraethylenepentamine using a solvent/non-solvent solution followed by supercritical drying.

It is a second object of this invention to synthesize a microcellular methacrylate-based copolymer foam of methylmethacrylate and ethyleneglycol dimethacrylate using a solvent/non-solvent solution followed by supercritical dryxg.

It is a third object of this invention to polymerize and dry a microcellular foam in a single reactor by utilizing a near supercritical fluid diluent.

These and other objects of this invention will be evident when viewed in light of the drawings, detailed description, and appended claims.

DETAILED DESCRIPTION OF THE DRAWINGS

DETAILED DESCRIPTION OF THE INVENTION

Reactants

Figure 1:
FIG. 1 is a scanning electron micrograph (SEM) of a sample of composition: 3 ml methylmethacrylate; 2 ml ethyleneglycol dimethacrylate; 2 ml toluene; and 3 ml heptane.

The monomers methylmethacrylate (MMA) (98%) and ethylene glycol dimethacrylate (EGDMA) (99%) were purified by successive washing with 10% w/w sodium hydroxide (NaOH) solution to remove the free radical inhibitor. The inhibitor-free monomers were washed in distilled and deionized water to remove the NaOH. The residual water in the monomers were removed by adding a small amount of magnesium sulfate (MgSO$_4$). After 12-15 hours, the monomers were filtered out.

The monomers Bisphenol-A, (Epon ™-829), commercially available from Shell Chemical Co., and tetraethylene pentamine were used as is.

Solvents/Non-solvents Diluents

The solvents, methylisobutylketone (MIBK) and toluene were reagent grade. The non-solvents, butanol, methanol and heptane were also reagent grade.

Freon-22, carbon dioxide (CO$_2$) and propane were used as received without further purification.

Initiators

Benzoylperoxide (BPO), reagent grade, and tert-butylperoxy pivalate (TBPP) (75%) in mineral spirits were used as initiators for the methacrylates.

Polymerizations

The methacrylate polymerizations were free-radical polymerizations. These reactions involve three steps, initiation, propagation and termination. The initiation step yields a reactive species which is a free radical. This free radical then propagates by reacting with the monomers and later terminates to produce the polymer. In free radical polymerizations, high molecular weight polymer is formed immediately and the molecular weight of the polymer is relatively unchanged during the polymerization although the overall percent conversion of monomer to polymer increases with reaction time. Therefore, the early stages of the polymerization consist of dilute solutions of very long chains dissolved in a monomer and diluent mixture. This stage of polymerization is distinctly different from a condensation polymerization where the entire solution polymerizes at the same rate and the solution consists of a large number of short oligomeric chains.

In this application, the following set of abbreviations will be employed:

| MMA | methyl methacrylate |
| PMMA | polymethyl methacrylate |
| EGDMA | ethyleneglycol dimethacrylate |
| MIBK | methylisobutyl ketone |
| TBPP | tert-butylperoxy pivalate |
| BPO | benzoyl peroxide |
| TP | tetraethylpentamine |

A schematic representation of the copolymerization of MMA with difunctional EGDMA is provided below. An additional complexity of the copolymer methacrylate system is the substantial crosslinking via the addition of ethylene glycoldimethacrylate (EGDMA). It has been shown that the density of the final product decreases monotonically as the percentage EGDMA increases to 40 wt %.

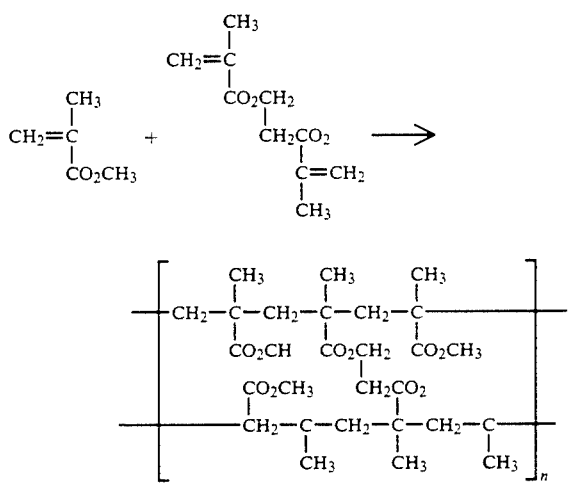

The epoxy polymerizations, by contrast, are condensation polymerizations. In the instant case, this indicates that the polymerizations occur by reaction of the epoxide with the amine, with sufficient activation energy (i.e. temperature) to subsequently react. This type of polymerization, tends to be slower and more uniform in conversion than free radical mechanisms. In rudimentary schematic form, one example of this type of condensation polymerization may be characterized as:

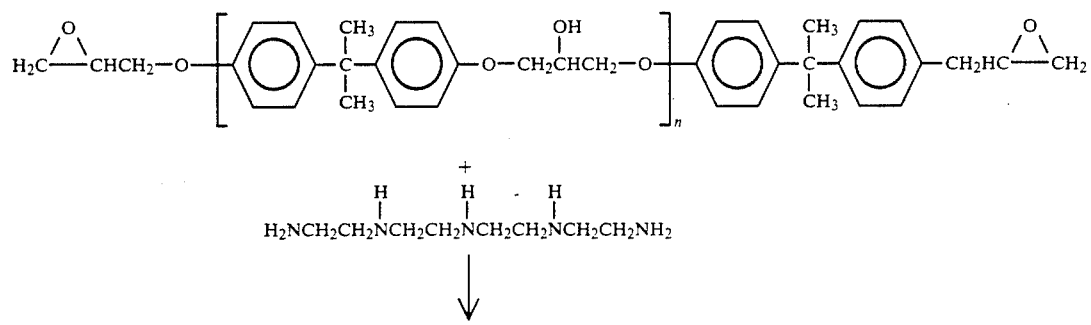

-continued

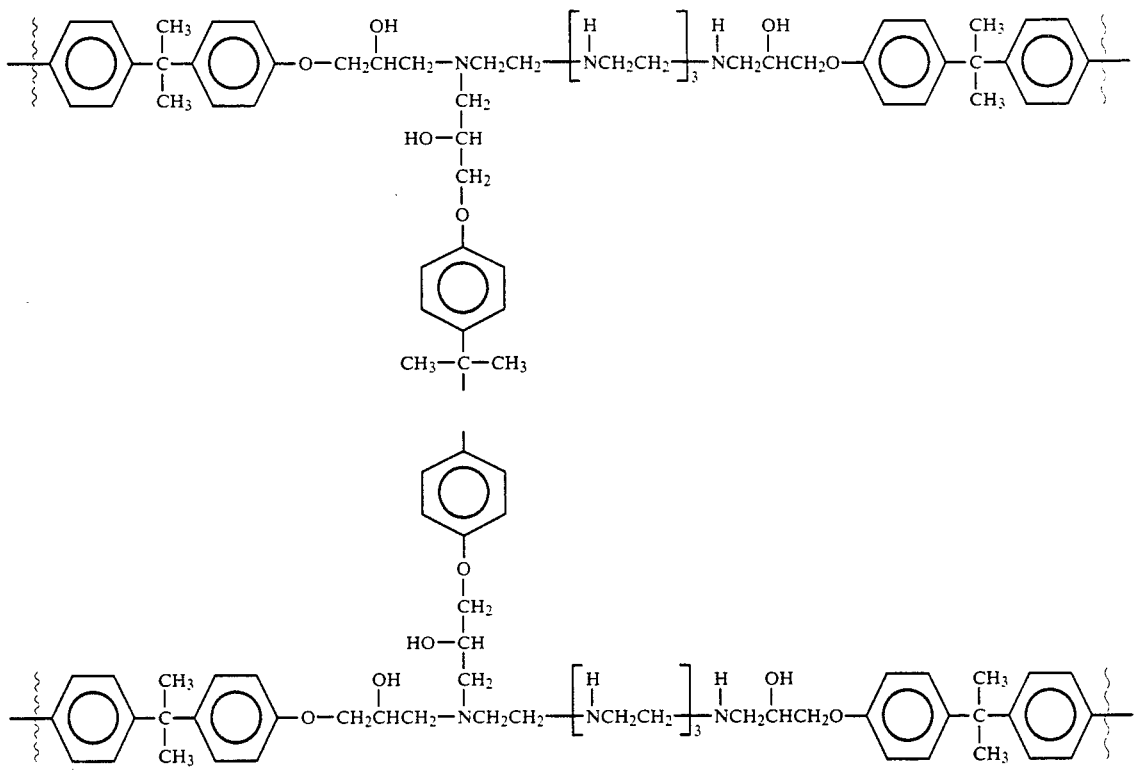

Since the polymerizations are carried out in dilute solutions, the time for complete polymerization and complete crosslinking is longer than for free-radical polymerization, and the solution chemistry, (i.e. phase behavior), is significantly different. The long chains from the free radical polymerization tend to precipitate out of solution before extensive intermolecular crosslinking, simply due to size. The formation of polymeric sols in the epoxy systems, on the other hand, is closely related to the degree of crosslinking.

Methacrylate Microcellular Foam Polymerization with Supercritical Drying

MMA and EGDMA are copolymerized in a diluent and cured at about 50°–75° C. As used in this application, diluent is intended to mean a solvent which has a relatively strong interaction with the polymer and non-solvent means a diluent which has a weak interaction. Strong solvents are capable of completely dissolving the monomer and non-crosslinked polymer. They are also capable of swelling the crosslinked polymer, often to remarkably large proportions depending on the strength of the interaction and degree of crosslinking. Strong non-solvents cannot dissolve or swell the polymer and function to promote phase separation of the polymer from solution.

Toluene is an example of an acceptable diluent. The ratio of MMA/EGDMA should be between 20:1 to 1:1 with 3:2 being near optimal. The ratio of diluent/monomer should be between 10:1 to 1:3, where monomer refers here to both MMA and EGDMA. After maintaining the solution at constant temperature between 50°–75° C. for 24–48 hours, gelation takes place. The sample is removed from the oven and allowed to cool to room temperature. After cooling, the sample is placed in a high-pressure reactor which is cooled to 10°–15° C. and filled with liquid carbon dioxide or other near-critical liquid.

After 4–8 hours, the high-pressure reactor is vented enough to remove some of the liquid contents, but not so much as to expose the polymeric material to vapor. The reactor is then refilled with near-critical liquid. This process is repeated several times until the diluent in the polymer has been totally removed and replaced by near-critical liquid. The high-pressure reactor and its contents are then raised to a supercritical temperature (45° C. for carbon dioxide is sufficient) while maintaining the pressure well above the critical pressure. After holding the reactor and its contents at those conditions for 30–60 minutes, the vapors are vented until the pressure drops to ambient pressure and the reactor is opened and polymeric product collected.

EXAMPLE 1

Specifically, 0.005 g of BPO or 0.005 ml TBPP were used. The polymerization was performed at 60° C. in an 11 ml glass ampule provided with a screw cap. The volume of MMA+EGDMA was 5 ml. The ratio of monomer to solvents was 1:1. The polymerization was allowed to proceed to about five times the half-life period of the initiators. The half-life of BPO is 10 h at 73° C. and for TBPP is 10 h at 55° C. After polymerization, the samples were cooled back to room temperature. The glass ampule was then carefully broken and the samples removed. The samples were swollen in toluene for 24 h. The degree of swelling gave a measure of crosslinking in the polymer. The polymers were then ready for washing and supercritical drying.

For washing, the gels were placed in a high pressure reactor. The air trapped in the reactor was slowly removed by opening the exit valve and simultaneously filling the reactor with liquefied carbon dioxide at 900 psi and 8° C. The temperature of the reactor was controlled to within ±4° C.

The gels were kept immersed in liquefied carbon dioxide by opening the exit valve. In this way, the sample was always immersed in liquid $CO_2$. Thus, the diluents in the pores of the gel were replaced by $CO_2$. Five flushes were conducted in 24 h to complete the washing phase.

At the end of this phase, the inlet and outlet valves of the pressure reactor were closed and the temperature of the water bath raised to 45° C. The critical point of $CO_2$ is 1,100 psi at 31° C. During heating, care was taken to insure that the pressure did not go beyond 1,500 psi. The $CO_2$ was released at pressures greater than 1,200 psi. After 6 h, the reactor was brought to atmospheric pressure isothermally at 45° C. the apparatus was then cooled and the samples removed.

The results for various copolymer microcellular materials are found in Tables I-IV. The ratios of solvent/non-solvent as well as the choice of solvents and non-solvents used are summarized in columns 2-3. The density of the copolymer microcellular foams prepared by subsequent air drying of the product are tabulated in column 4. The corresponding densities of the same material, which has been dried under supercritical conditions is listed in column 5 for comparative purposes.

TABLE I

| EGDMA (ml) | Toluene (ml) | Butanol (ml) | Drying | |
|---|---|---|---|---|
| | | | Air (g cm$^{-3}$) | Supercritical (g cm$^{-3}$) |
| 1 | 5 | 0 | 1.15 | 0.96 |
| 1.5 | 5 | 0 | 0.91 | 0.75 |
| 2 | 5 | 0 | 0.80 | 0.64 |
| 1.5 | 4 | 1 | 0.87 | 0.79 |
| 1.5 | 2 | 3 | 0.98 | 0.80 |
| 1.5 | 1 | 4 | 0.78 | 0.69 |

TABLE II

| EGDMA (ml) | Toluene (ml) | Methanol (ml) | Drying | |
|---|---|---|---|---|
| | | | Air (g cm$^{-3}$) | Supercritical (g cm$^{-3}$) |
| 1 | 1 | 4 | 1.11 | 0.83 |
| 1.5 | 2 | 3 | 0.93 | 0.79 |

TABLE III

| EGDMA (ml) | Toluene (ml) | Heptane (ml) | Drying | |
|---|---|---|---|---|
| | | | Air (g cm$^{-3}$) | Supercritical (g cm$^{-3}$) |
| 1 | 0 | 5 | 0.58 | 0.55 |
| 1.5 | 4 | 1 | 0.68 | 0.65 |
| 1.5 | 3 | 2 | 0.57 | 0.57 |
| 2 | 4 | 1 | 0.64 | 0.61 |
| 2 | 2 | 3 | 0.57 | 0.56 |

TABLE IV

| EGDMA (ml) | MIBK (ml) | Butanol (ml) | Drying | |
|---|---|---|---|---|
| | | | Air (g cm$^{-3}$) | Supercritical (g cm$^{-3}$) |
| 1 | 5 | 0 | 0.86 | 0.80 |
| 1 | 4 | 1 | 1.12 | 0.84 |
| 1 | 3 | 2 | 1.11 | 0.83 |
| 1 | 2 | 3 | 1.05 | 0.83 |
| 1.5 | 4 | 1 | 0.83 | 0.70 |
| 1.5 | 3 | 2 | 0.81 | 0.72 |
| 1.5 | 2 | 3 | 0.77 | 0.69 |
| 2 | 4 | 1 | 0.75 | 0.67 |
| 2 | 3 | 2 | 0.74 | 0.68 |
| 2 | 2 | 3 | 0.76 | 0.66 |

The data obtained from the experiments indicates that supercritical drying results in about a 15% reduction in density relative to air drying. Methyl isobutyl ketone (MIBK) is not as effective as toluene in decreasing the density and pore size. Increasing the amount of EGDMA generally decreases the density of the final material. In cases where EGDMA was not included, the materials almost always collapsed. Neither butanol nor methanol had a significant advantage in decreasing the density. Among the non-solvents, heptane gave the lowest density.

Figure 2:
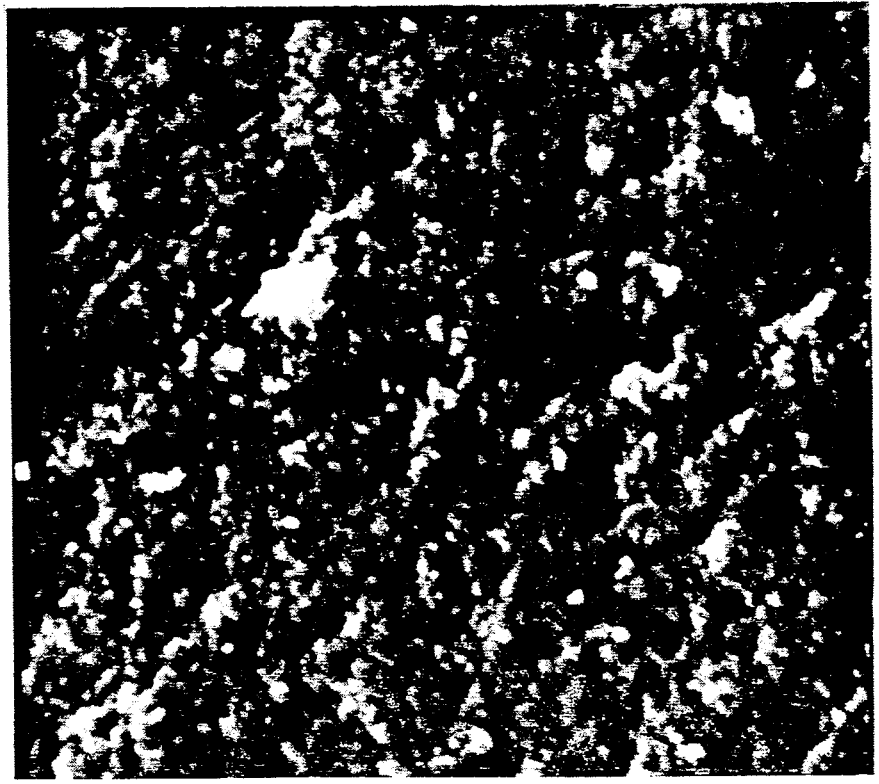
FIG. 2 is a scanning electron micrograph of a sample of composition: 3 ml methylmethacrylate; 2 ml ethyleneglycol dimethacrylate; and 5 ml toluene.

As seen in FIGS. 1 and 2, scanning electron micrographs show a bead-like structure. The magnitude of the void space between beads depends on the type of solvent/non-solvent combination. Additionally, SEM photographs reveal that the pores are interconnected rather than closed-celled and that the pores are small and relatively uniform.

When heptane was used as the non-solvent, the samples did not show any improvement on supercritical drying (i.e., the densities of the samples were nearly the same irrespective of the method of drying employed). The SEM micrographs of the samples that used heptane showed macrocellular structure and the average cell size was an order of magnitude higher than that obtained when the other non-solvents were used.

This is clearly seen in FIG. 1, which is a typical SEM micrograph for the heptane runs. The cell size is greater than 10 μm. FIG. 2 shows another typical SEM micrograph for the case where only toluene was used. The smallest cells obtained for the MMA+EGDMA system were 1 μm.

There is a distinct difference in the cell structure for the two cases. It appears to seem that supercritical fluid (SCF) percolates through the interconnected pores and the lack of a discrete phase change helps reduce capillary forces in the pores, thus preserving the polymer network. The high diffusivity of the SCF solvent facilitates solvent removal.

Pore size is dependent on the affinity between the polymer and solvent used. Larger pores are formed when the affinity goes down. While not wishing to be bound by theory, it is believed that this is due to easier phase separation. The affinity between polymer and solvent can be estimated using the Flory interaction parameter and Hildebrand solubility parameter. As the solubility parameter goes down, the pores become larger. This is probably the reason for the macrocellular bead-like structure obtained in the case of heptane. It should be noted that the pore size did not increase when the solvent's solubility parameter was significantly larger than that of the polymer. Naturally, this discussion assumes that the final structure is primarily controlled by the nature of the equilibrium phase diagram. Because of the long times involved in the solvent replacement and subsequent drying, it is believed that the kinetics do not determine the structure of the microcellular product.

For the toluene runs, the density decreased with an increase in amount of crosslinker used. It was observed that the best results were obtained when EGDMA represented 40% of the monomeric liquid. When a higher percentage of EGDMA was used, the material cracked extensively during polymerization. Roughly a 30% reduction was possible at 40% EGDMA. The benefit of supercritical drying was another 15% reduction in density. The use of non-solvents in the diluent did not lead to any significant advantage.

Methacrylate Microcellular Foam Polymerization with Near Supercritical Process Conditions Direct polymerizations in near-critical solvents to synthesize microcellular foams were also performed. As used in this application, a near-critical solvent is one that has a critical temperature low enough that it can be exceeded in the supercritical fluid drying process without damaging the substrate foam. In this way, the polymerization, washing, and drying was converted into a polymerization and drying process in a single reactor. Previous attempts to apply a similar process to resorcinol-formaldehyde aerogels resulted in substantial changes to the polymer product.

Polymerization in supercritical fluids is a relatively recent field. The polymers which have been obtained have generally been variants on the original high pressure polyethylene process or the polymers have been of relatively low molecular weight (4,000 or less). As for crosslinking during polymerization, this has apparently led to precipitation of the polymer from the supercritical fluid phase.

The experiments were performed with MMA as the monomer and EGDMA as the crosslinker and either Freon-22 or propane as the supercritical solvent. The monomer/solvent ratio was fixed at 1:1, but the ratio of monomer/crosslinker was varied. TBPP was used as the initiator.

The initiator concentration was 0.1% of the monomer weight in all experiments. Therefore, 0.005 ml of TBPP was used in all experiments. The reaction temperature was 70° C. and 1,000 psig. This is below the critical temperature and above the critical pressure of either solvent and provides an optimum level of free radicals to the system. The critical temperatures and pressures of the solvents are given in Table V.

Examples of other supercritical solvents which could be used are diethyl ether, methyl chloride, trimethylamine, chloropentafloroacetone, perfluoro acetone, ethyl chloride, ethyl fluoride, methyl formate, and acetaldehyde. In fact, almost any solvent with a relatively low critical temperature (<200° C.) is a candidate. The pertinent restriction which is applied to the solvent is that it be within its supercritical range in the phase diagram during the drying stage. It is not essential that the solvent be in this region of the phase diagram during the polymerization.

TABLE V

| Solvent | $T_c$ (K) | $P_c$ (MPa) | $T_b$ (K) |
|---|---|---|---|
| Propane | 369.8 | 4.25 | 231.1 |
| Freon-22 | 369.8 | 4.97 | 232.4 |

The polymerization time was set at five times the half-life period of the initiator. The half-life of TBPP at 70° C. is 100 minutes. The time was set to ensure that the reaction went to high conversions. Consequently, the polymerization was allowed to proceed for about 8 hours before the conditions were changed for the drying step.

EXAMPLE 2

Each experiment could be divided into two stages; (a) polymerization stage, and (b) drying stage. The polymerization was performed at 70° C. and 1,000 psig. At these conditions, the diluents could be classified as near-critical liquids. The pure and dry monomers and initiator were loaded into the pressure reactor and the diluent added later.

After loading the monomers, the high pressure reactor was cooled to a temperature below the boiling point of the solvent at atmospheric pressure using dry The boiling points of Freon-22 and propane are −40.8° C. and −42.1° C. respectively. A measured amount of the solvent which was previously collected as a liquid in a beaker was then added to the monomer mixture. A plug was installed into the end cap of the pressure reactor and immediately tightened to seal that end of the apparatus. The reactor was then placed in an oven and connected to the high pressure generator through a quick connect. The reactants were then pressurized to 1,000 psig quickly and held constant as the temperature increased to 70° C. The polymerization was allowed to proceed for about 8 hours at about 70° C. before heating it up for the drying step.

The temperature of the system was then raised to 100° C. at the constant pressure of 1,000 psig. This temperature is above the critical temperature of either solvent and below the glass transition temperature of polymethyl methacrylate which is 105° C. Although the crosslinked material had different thermal properties from PMMA, the glass transition temperature of PMMA was regarded as safe with respect to undesirable side effects. PMMA is known to depolymerize at high temperatures. The condition were maintained at 100° C. and 1,000 psig for about 6 hours. The pressure was then gradually reduced to atmospheric pressure at a temperature of 100° C., by backing out the piston of the high pressure generator. The polymer was then removed after cooling the apparatus to room temperature. The results of the experiments are summarized in Table VI.

TABLE VI

| Sample | % EGDMA | Diluent | Density |
|---|---|---|---|
| 1 | 10 | freon | 0.910 |
| 2 | 20 | freon | 0.646 |
| 3 | 30 | freon | 0.508 |
| 4 | 40 | freon | 0.408 |
| 5 | 60 | freon | 0.470 |
| 6 | 80 | freon | 0.596 |
| 7 | 90 | freon | 1 |
| 8 | 10 | propane | 0.378 |
| 9 | 20 | propane | 0.700 |
| 10 | 30 | propane | 0.753 |
| 11 | 40 | propane | 1.017 |
| 12 | 60 | propane | 1.200 |

Figure 3:
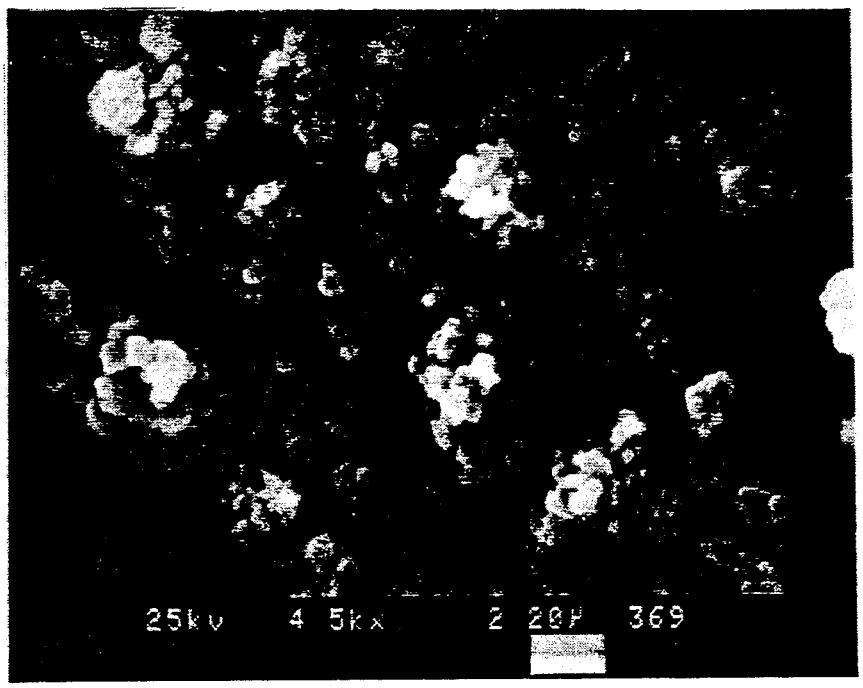
FIG. 3 is a scanning electron micrograph for 40% ethyleneglycol dimethacrylate; 60% methylmethacrylate prepared with propane as the diluent.
Figure 4:
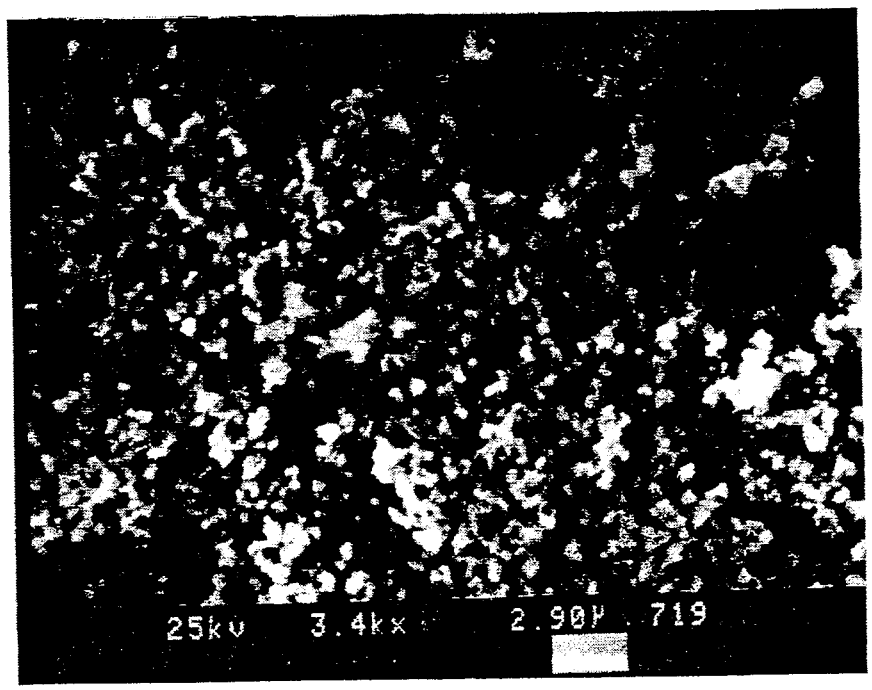
FIG. 4 is a scanning electron micrograph for 40% ethyleneglycol dimethacrylate; 60% methylmethacrylate prepared with freon as the diluent.

As seen from Table VI and FIGS. 3-4, the morphology of polymers prepared in propane (FIG. 3) is different from the morphology of equivalent polymers prepared in freon-22 (FIG. 4). In each case, the structure of the polymer prepared in the more polar freon is smaller than the structure of the polymer prepared in non-polar propane.

Unexpectedly, increasing crosslinking does not always lead to a lower density. As shown in Table VI, increased crosslinking leads to lower density in the freon systems up to 40 wt % EGDMA, but higher densities result at 60 wt % and 80 wt % EGDMA. A similar trend is evident in the propane systems, but the minimum density appears at only 10 wt % EGDMA. While not wishing to be bound by theory, it is speculated that higher crosslinking leads to earlier phase separation and "squeezing" diluent out of the polymer phase. The resulting polymer would then be relatively dense because it never solubilizes enough diluent to permit a density reduction when drying.

An advantage of the supercritical fluid process is that conditions and concentrations can be adjusted in order to tailor the morphology to a specific application. The major benefit of supercritical fluid processing is that the entire reaction can occur in one reactor.

While the above discussion has focused on the methacrylate system, the procedure is general, and with minor variations, can be applied to other systems. In extending this procedure to other co-polymerization systems, it is envisioned that other supercritical fluids may be needed to be employed as solvents, and the need may arise, where it is critical to incorporate non-solvents into the polymerization, such as was described previously.

Epoxy Microcellular Foam Polymerization with Supercritical Drying

The epoxy system is especially complex because the epoxy monomer, bisphenol-A (Epon-829 resin) and tetraethylene pentamine curing agent are chemically very different and their solubilities are different in different solvents. Therefore, the choice of an optimum solvent and non-solvent is very important. An important factor considered for the selection of diluent mixture was the solubility parameter of the epoxy and that of the diluent mixture. The solubility parameters of the epoxy and diluents are given in Table VII.

TABLE VII

| Compound | Solubility Parameter | Compound | Solubility Parameter |
|---|---|---|---|
| Epoxy | 9.17 | Butanol | 11.40 |
| Toluene | 8.90 | Toluene/Butanol (50/50) | 10.15 |
| MIBK | 8.58 | MIBK/Butanol (50/50) | 9.99 |

As shown in the table, the solubility parameters of the diluent mixtures that resulted in the lowest density foam were close to that of the epoxy. A number of other solvent/non-solvent mixtures with similar solubility parameters were tried, but in all cases, either a precipitate or a dense, hard gel was formed. Butanol was found to be the most important non-solvent, not just because of its role in phase separation, but because of its role as a catalyst to the crosslinking reaction of the epoxy. Since the crosslinking reaction was carried out in very dilute solution, the rate of crosslinking was very slow. The catalytic effect of butanol increased the rate of crosslinking such that a network of high molecular weight was formed before the polymer could phase separate out, and a foam was obtained. Ethanol and propanol, which can also act as catalysts, were tried as non-solvents, but were too strong. The rate of phase separation was faster than the rate of crosslinking and a precipitate formed. These observations suggest that the porous structure is formed only if the rate of crosslinking and the rate of phase separation are balanced.

The most important factor in determining the morphology of the product is the time of phase separation, which depends on the degree of crosslinking. The phase separation of the crosslinked polymer occurs either by macrosyneresis (deswelling of the gel) or by microsyneresis (formation of a dispersion of the separated diluent and the gel phases).

Microsyneresis prevails in lightly crosslinked gels, with slow relaxation times, while deswelling is dominant in highly crosslinked gels. Although the dispersed phase is unstable initially, it gradually becomes fixed through subsequent gel crosslinking. In several experiments, a combination of macro- and micro- syneresis occurs, and depending on the prevailing method of phase separation, two different kinds of morphologies were obtained.

Figure 5A:
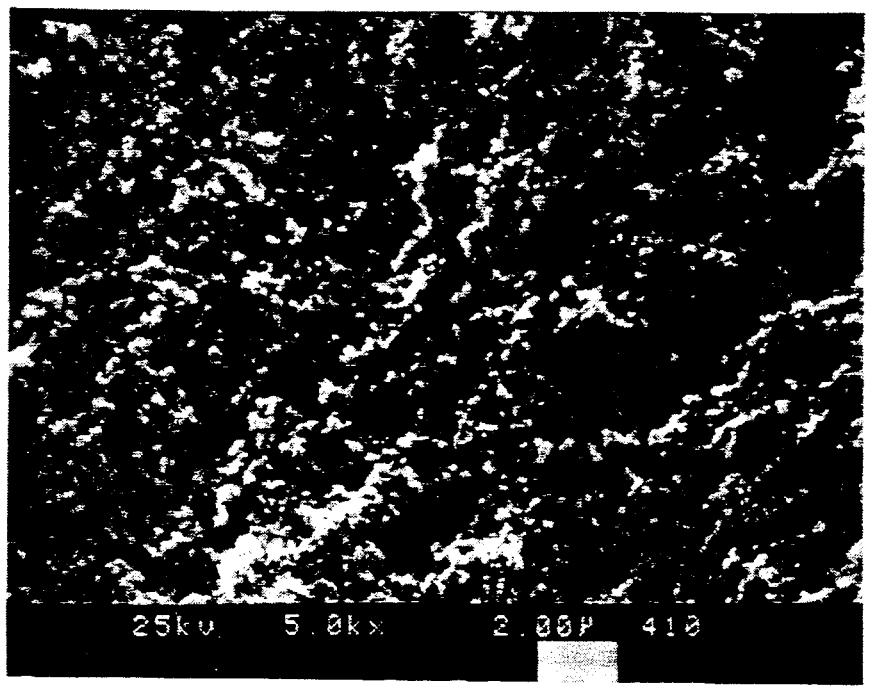
FIG. 5 is a scanning electron micrograph of the epoxy crosslinked in the presence of a diluent, showing the two different kinds of morphology (a) beaded morphology of a foam, and (b) closed cell morphology of a gel, Epoxy-40%.
Figure 5B:
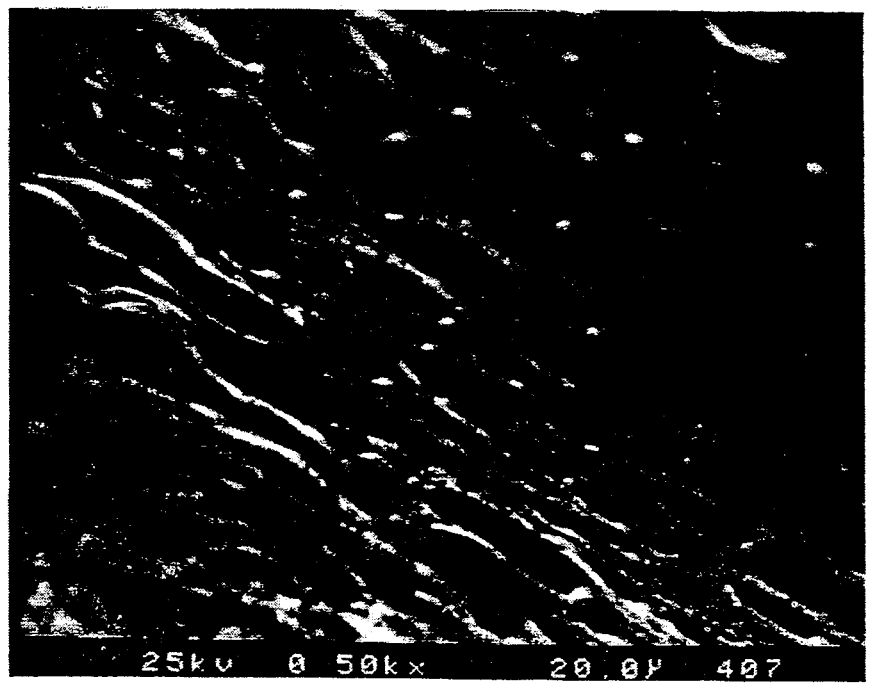

These morphologies are shown in FIG. 5. The beaded morphology was obtained, when microsyneresis took place, whereas the bigger cellular morphology was obtained, when deswelling took place.

The diluent must be a relatively strong solvent for the polymer and soluble in the comonomer solution. One key to the process is adjusting the ratio of hydrogen bonding in the diluent to obtain the highest possible dilution ratio for which viable products can be synthesized. The ratio of bisphenol-A/TP should be between 10:1 to 1:1, with 7:1 being near optimal. The ratio of diluent/monomer should be between 9:1 and 3:1, where monomer refers to both bisphenol-A and TP. No initiator is added because the polymerization begins immediately upon combination of the epoxy solution with the TP solution.

After maintaining the solution at constant temperature between 40°-50° C. for 5-7 days, gelation takes place, and crosslinking becomes extensive. Depending on the choice of diluent, the removal of diluent is near critical, or by exchanging the diluent for a suitable near critical solvent with subsequent supercritical drying.

Supercritical drying is effected by holding the reactor containing the polymer samples and near-critical diluent at a pressure of roughly two times the critical while raising the temperature from subcritical to about 5-10% above the critical temperature. After holding the reactor and its contents at those conditions for some time, 30-60 minutes, the vapors are vented until the pressure drops to ambient pressure and the reactor is opened and the polymeric product is collected. The product is a low-density polymer which appears to be smooth and uniform, even it is comprised of cross-linked polymer with void spaces of about 0.1 $\mu$m in diameter.

Scanning electron micrographs reveal that the pores are interconnected instead of being closed-celled and that the pores are small and relatively uniform.

The results of a series of experimental runs are summarized in Table VIII. The densities, and porosities when available, are given for a number of solvent/non-solvent diluent systems.

TABLE VIII

| Sample | Monomer initial conc. | Density | Porosity | Toluene | BuOH | MIBK |
|---|---|---|---|---|---|---|
| 101 | 10.0 | 0.20 | 0.83 | 40% | 60% | |
| 102 | 12.5 | 0.27 | 0.78 | 40% | 60% | |
| 103 | 15.0 | 0.32 | 0.73 | 40% | 60% | |
| 104 | 17.5 | 0.39 | 0.68 | 40% | 60% | |
| 105 | 20.0 | 0.44 | 0.63 | 40% | 60% | |

TABLE VIII-continued

| Sample | Monomer initial conc. | Density | Porosity | Toluene | BuOH | MIBK |
|---|---|---|---|---|---|---|
| 106 | 22.5 | 0.50 | 0.58 | 40% | 60% | |
| 107 | 25.0 | 0.55 | 0.54 | 40% | 60% | |
| 108 | 10.0 | 0.19 | 0.83 | 50% | 50% | |
| 109 | 12.5 | 0.29 | 0.75 | 50% | 50% | |
| 110 | 15.0 | 0.39 | 0.66 | 50% | 50% | |
| 111 | 17.5 | 0.48 | 0.58 | 50% | 50% | |
| 112 | 20.0 | 0.54 | 0.53 | 50% | 50% | |
| 51 | 10.0 | 0.16 | 0.86 | | 50% | 50% |
| 52 | 15.0 | 0.23 | 0.80 | | 50% | 50% |
| 53 | 20.0 | 0.33 | 0.71 | | 50% | 50% |
| 54 | 25.0 | 0.43 | 0.63 | | 50% | 50% |
| 55 | 30.0 | 0.54 | 0.53 | | 50% | 50% |
| 56 | 40.0 | 0.72 | 0.37 | | 50% | 50% |

Figure 6:
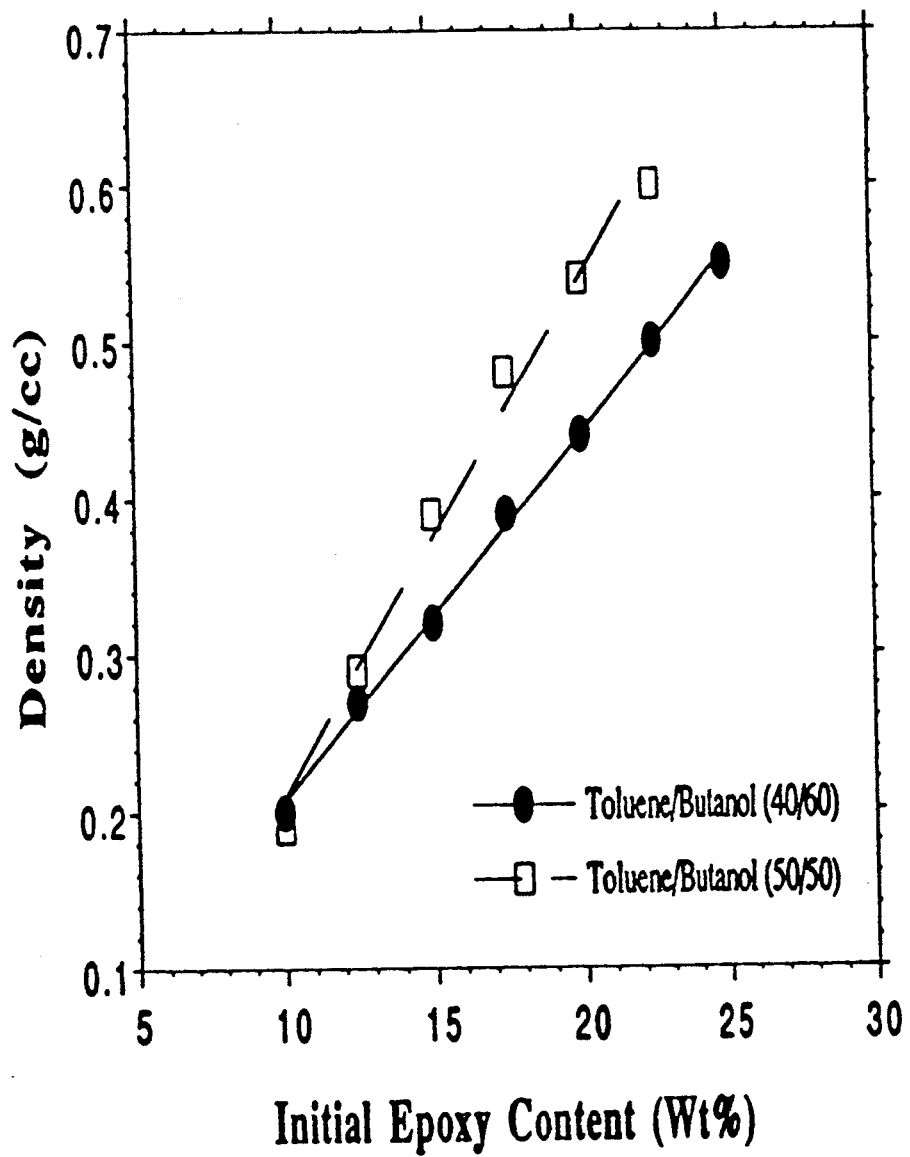
FIG. 6 is a graph of the variation in apparent density of the foam with the initial concentration of the epoxy in the cured solution; diluent—MIBK/Butanol (50/50); cure temperature—40° C.

The variation of the density of the foams with different variables is shown in Table VIII. The density of the foam increases with an increase in the polymer concentration, since the solids content increases. The density shows a linear variation with the initial concentration for foams with all different solvents. Comparison of the densities with the same initial concentration, but different composition of solvent/non-solvents is shown in FIG. 6. As shown in the figure, the density is higher with a lower non-solvent content. The time of phase separation is delayed with a lower non-solvent content, the phase separation takes place at a higher degree of crosslinking, and hence, for the same initial concentration, the density is higher.

Figure 7A:
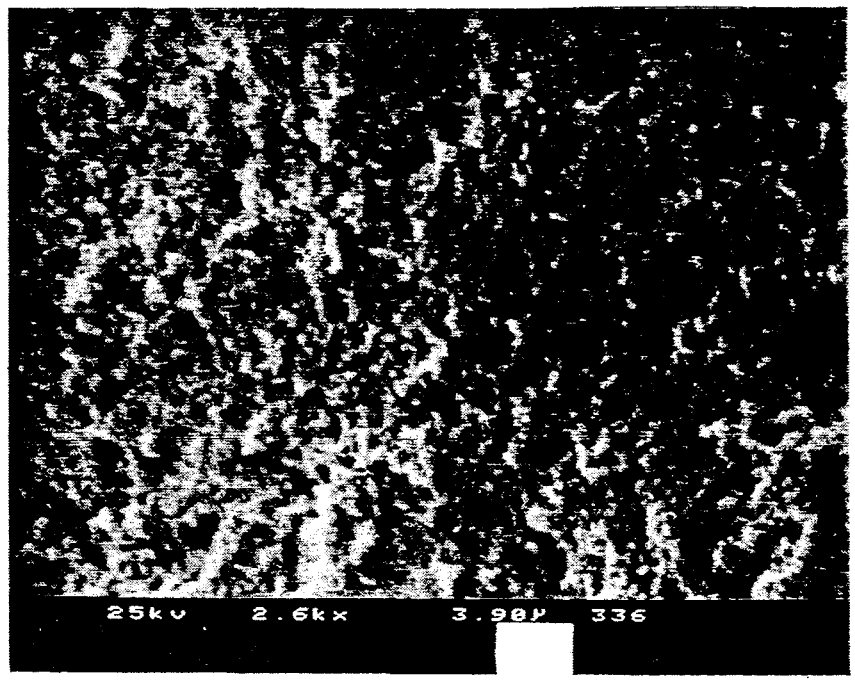
FIG. 7 are scanning electron micrographs of the microcellular foam showing the change in morphology with initial concentration of epoxy; diluent—toluene/butanol (50/50); (a) epoxy—10%; (b) epoxy—12.5%; (c) epoxy—15%.
Figure 7B:
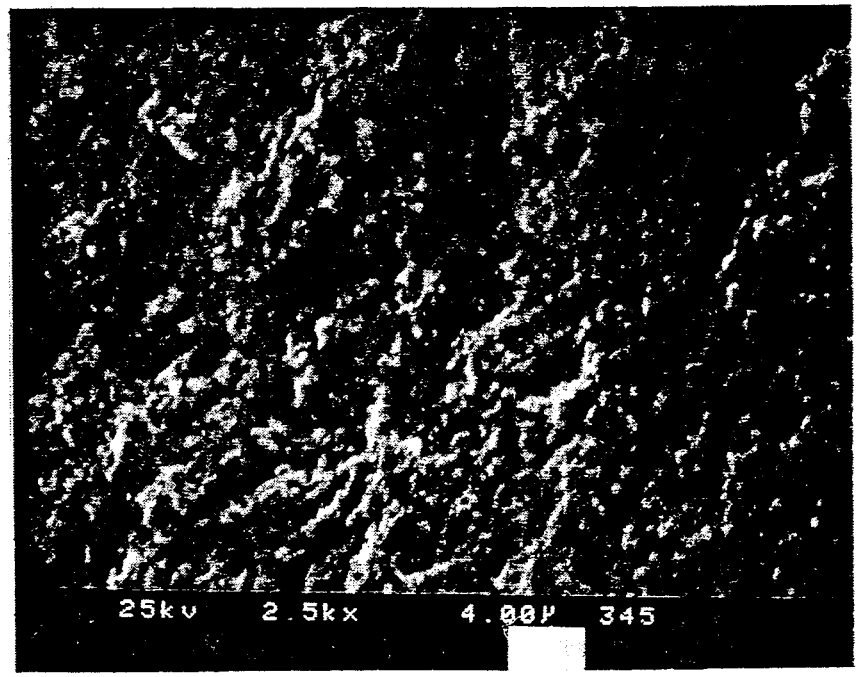
Figure 7C:
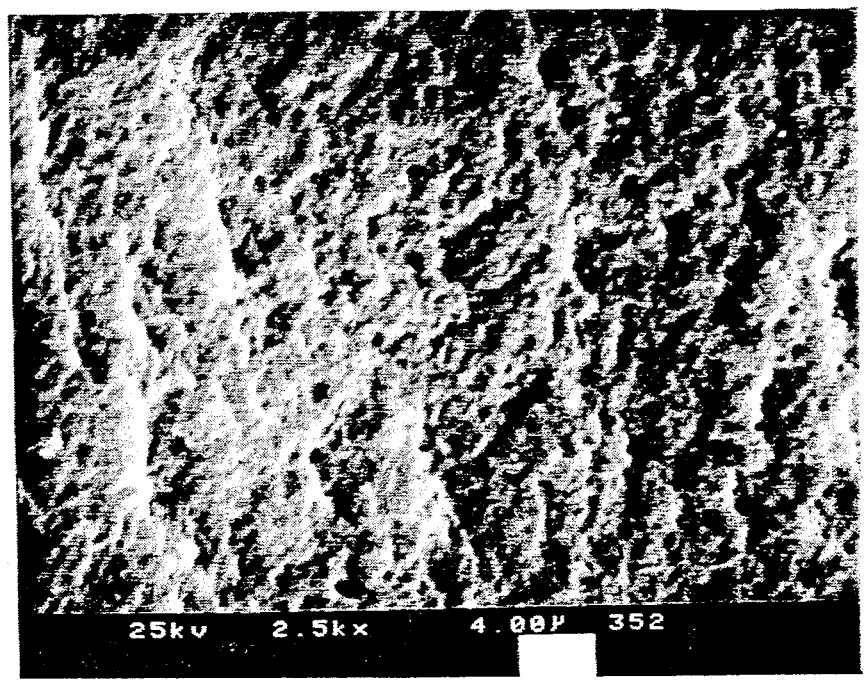

The morphology of these foams was determined using scanning electron microscope. The SEM's of the foams are shown in FIG. 7 (a-c). The microcellular foams show the beaded morphology, with a bead size less than 1 μm. The foam has an interconnected structure. The holes in FIG. 7b are the solvent droplets that phase separated, but could not diffuse out of the gel. This morphology was obtained at high epoxy concentrations.

In general, it is observed that the structure is more beaded with higher non-solvent diluent, which also explains lower density. A striking feature about all these morphologies is that, although the porosity and the density of the foams vary with dilution ratio and the diluent mixture composition, the size of the beads or the pores is almost in the same region of 0.1 μm. It is believed that changes in the morphology can only be developed by making changes in the chemistry of the system.

DISCUSSION

While the foregoing discussion has been limited to two component (i.e. copolymer) systems, it is envisioned that the process and synthetic steps described would be applicable to homopolymers with at least two reactive sites. It is essential that one of the reactive sites effect the polymerization reaction and that a second reactive site be capable of effecting the crosslinking reaction. In this way, it is possible to synthesize a rigid microcellular foam from a homopolymer solution.

In order to maximize the synthetic potential of the present technique, it is critical to elucidate the mechanism of the formation of the microporous structure, as it is formed in-situ. Previous scanning electron micrographs clearly indicate that the microcellular foams are comprised of tiny beads of polymer from 0.01–1.0 μm in diameter. To control the morphology, it is important to know whether the beads are formed during the polymerization or during the drying stage. Dynamic light scattering is ideal for studying this phenomenon.

Dynamic Light Scattering

MMA and EGDMA were used as the comonomers in this study. Freon-22 was used as the diluent. TBPP was used as the free radical initiator. To prepare a typical reaction mixture, MMA and EGDMA were added to a 40 ml high pressure reactor in the proportions of 12 ml of MMA and 8 ml of EGDMA. 20 μl of TBPP were added and the high-pressure reactor attached to tubing with an open-shut valve. The reactor and contents were cooled in ice and connected to a supply of Freon-22 kept at room temperature. The freon valves were opened and Freon allowed to condense into the bomb for 10–20 minutes. The valves were closed, the freon tank disconnected and the high-pressure reactor and its contents refrigerated until use. To charge the high pressure light scattering cell, the high-pressure reactor was raised to room temperature and the scattering cell was cooled to 5° C.

The high pressure light scattering cell was similar to conventional light scattering cells except that it was made of ¾" pyrex and the bottom was open to a mercury resevoir that permitted regulation of the pressure. The height of mercury in the cell was adjusted to keep reactive solution out of the cell's mercury reservoir while keeping the mercury well below the light path. The high-pressure reactor was inverted and connected to the scattering cell and the monomer plus diluent solution was allowed to condense into the cell for 10–20 minutes. Valves were sealed and capped and the pressure was adjusted to about 400 psig at room temperature. The temperature in the cell was raised to the designated value by heating tape.

Time-resolved scattering intensities were measured at 90° angle using a Thorn-EMI photomultiplier tube and a Brookhaven Instruments amplifier/discriminator integral with the phototube housing. The data was analyzed using a Brookhaven Instruments Corporation BI-2030AT correlator using Brookhaven Instruments NNLS fitting software to estimate the particle size distribution as a function of reaction time.

Dynamic light scattering detects the presence and diffusion coefficients of disperse inhomogeneities in a bulk fluid. Typically, diffusion coefficients can be measured for dispersions ranging in size from 1 nm–10 μm.

In general, without being constrained to any particular theory, it is believed that there are at least three possible mechanisms by which monomer solution may evolve into a macroscopic bulk microporous material. First, the system may consist of steadily growing primary particles which grow until they fill the entire solution. The particle size histograms of such a system would show a broad polydisperse population of particles with the peak slowly moving to higher sizes.

Second, the system could grow in stages whereby small particles are generated, then flocculated into large particles that are eventually too big to grow, then a new population of small particles evolves and begins to flocculate. The particle size distributions in this case would appear as waves of particles size peaks when considered as a function of time.

A third possibility would be that the primary particles grow to a certain size then stop growing until the concentration of particles becomes so great that the particles percolate at a gelation point and convert from disperse sols to the macroscopic material in a very short time. In this case, very monodisperse populations of the largest, but still small, particles, would be expected. However, the scattering count would change as more scatterers evolve until the solution gels.

Table IX summarizes the light scattering data for the methacrylate free radical polymerization. The reactions were terminated at the times indicated above columns 2-4. Table X summarizes the light scattering data for the condensation polymerization. As with the previous table, the reactions were terminated at the times indicated above columns 2-5.

TABLE IX

MMA + EGDMA Free-Radical Polymerization

| particle diameter (nm) | population density % relative to most populous particle size | | |
|---|---|---|---|
| | 30 min. | 42 min. | 43 min. |
| 1.0 | 60 | 0 | 0 |
| 1.5 | 100 | 0 | 0 |
| 2.0 | 60 | 0 | 0 |
| 2.5 | 0 | 0 | 0 |
| 3.0 | 0 | 66 | 0 |
| 3.5 | 0 | 100 | 0 |
| 4.0 | 0 | 66 | 0 |
| 6.0 | 0 | 0 | 0 |
| 7.0 | 0 | 0 | 0 |
| 10.0 | 0 | 17 | 0 |
| 13-14.0 | 0 | 34 | 39 |
| 16-18.0 | 0 | 43 | 79 |
| 21-22.0 | 0 | 34 | 100 |
| 24-27.0 | 0 | 17 | 79 |
| 32-34.0 | 0 | 0 | 39 |
| 42.0 | 0 | 0 | 0 |
| 56.0 | 0 | 0 | 0 |

TABLE X

Bisphenol-A + TP Condensation Polymerization

| particle diameter (nm) | population density % relative to most populous particle size | | | |
|---|---|---|---|---|
| | 1.0 hr. | 1.5 hr. | 3.5 hr. | 5.0 hr. |
| 1.0 | 70 | 71 | 74 | 0 |
| 1.3 | 100 | 100 | 100 | 0 |
| 1.7 | 70 | 71 | 74 | 0 |
| 2.0 | 0 | 0 | 29 | 0 |
| 2.5 | 0 | 0 | 0 | 0 |
| 3.0 | 0 | 0 | 0 | 0 |
| 3.5 | 0 | 0 | 0 | 0 |
| 4.0 | 0 | 16 | 0 | 0 |
| 4.5 | 0 | 38 | 0 | 0 |
| 5.0 | 0 | 50 | 0 | 0 |
| 5.5 | 0 | 38 | 0 | 0 |
| 6.0 | 0 | 0 | 0 | 0 |
| 7.0 | 0 | 0 | 0 | 0 |
| 9.0 | 0 | 0 | 0 | 67 |
| 10.0 | 0 | 0 | 16 | 100 |
| 11.0 | 0 | 0 | 21 | 67 |
| 12.0 | 0 | 0 | 16 | 0 |
| 13.0 | 0 | 0 | 6 | 0 |
| 15.0 | 0 | 0 | 0 | 0 |

As is evident from Table IX, the most plausible scenario for free radical polymerization is the third scenario described above. The initial appearance of the particles at ~1 nm probably corresponds to the polymer backbone. The peak at 3 nm probably corresponds to assemblies which have been minimally crosslinked. The peak at ~22 nm corresponds to the final beads of polymer which make up the polymer matrix of the polymer foam. The significance of this data lies in the observation that the primary particles are very small, and that they do not flocculate, but rather percolate at gelation. There probably is some transition in particle size, but there is not a large enough population of these intermediate size particles to show up in the scattering measurement.

Table X indicates a similar mechanism for the condensation polymerization, but the primary particles are much smaller.

This all appears to indicate that certain particle sizes are more favored than others, and that the polymerization occurs by rapidly populating these favored sizes until three-dimensional connectivity occurs (percolation). This indicates that these same particles are preserved in the macroscopic material even through the supercritical drying process. Thus, the drying process would appear to have little adverse impact on the morphology of the macroscopic material.

Figure 8:
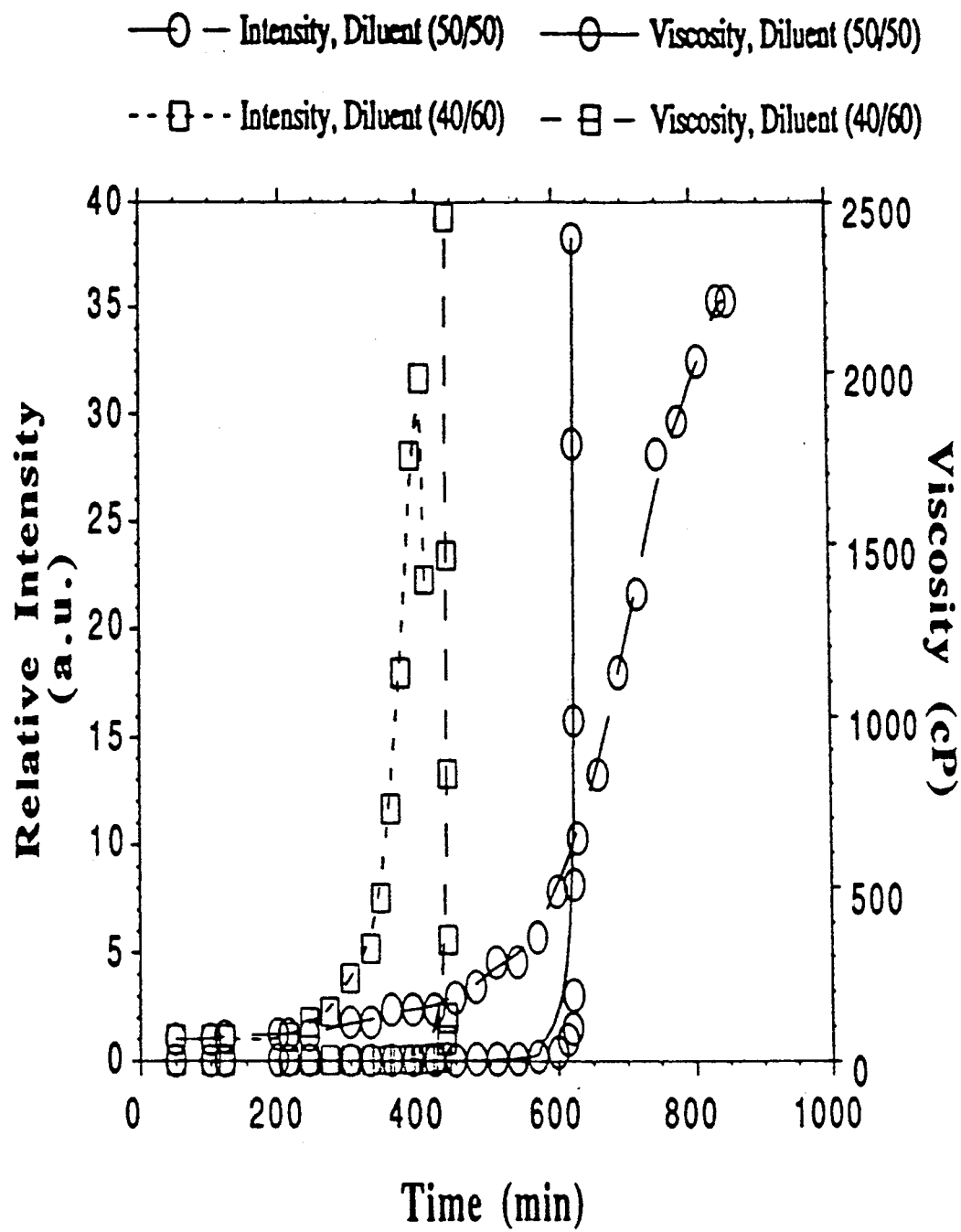
FIG. 8 is a scanning electron micrograph of (a) gelation and (b) phase separation.

This light scattering data can be cross-referenced with data on the total intensity and gelation times for the epoxy polymerizations. FIG. 8(a) shows a polymerization where gelation occurs before a large number of primary particles have been generated. The intensity tracks the concentration of primary particles whereas viscosity tracks gelation. FIG. 8(b) shows a case where gelation occurs shortly after the creation of a large number of primary particles. The polymer in FIG. 8(a) is a hard dense gel, whereas the polymer in FIG. 8(b) is a microcellular foam.

Figure 9:
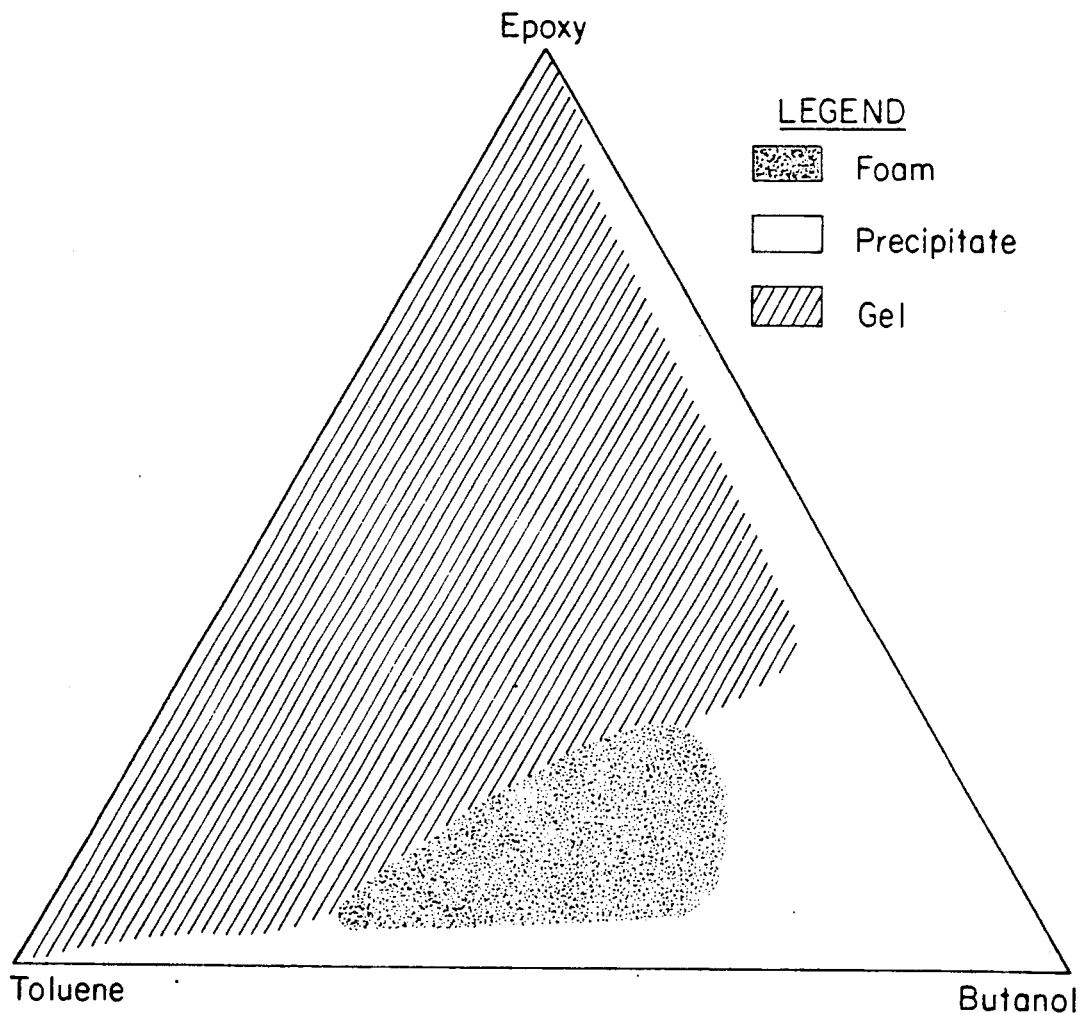
FIG. 9 is a phase diagram for the epoxy polymerization system.

As shown in the phase diagram given in FIG. 9, when the concentration of solvent or monomer is too high, a hard dense gel is formed. Additionally, when the concentration of non-solvent is too high, a precipitate is formed. When the combination is falls within the appropriate region, a microcellular foam is formed.

With this chemistry, it is now possible to describe a methodology for producing a microcellular foam, and conditions which will optimize the chemistry and resultant foam morphology. The first step is to devise a chemistry which generates primary particles which are small, because the size of these primary particles controls the limit of the ultimate pore size. Secondly, a solvent environment must be generated which causes these primary particles to separate just before gelation initiates. If the separation occurs too soon, a precipitate will form, and if separation occurs too late, a hard, dense gel will form. It is critical that the solvent environment be strong enough to swell the primary particles to as great an extent as possible after they have separated into their inhomogeneous regions in solution.

While in accordance with the patent statutes, a best mode and preferred embodiment have been described in detail, the invention is not limited thereto, rather the invention is measured by the scope of the attached claims.

What is claimed is:

1. A process for synthesizing a foam comprising the steps of:
   (a) polymerizing a monomer with a comonomer capable of crosslinking with the monomer in a solvent and a non-solvent at a temperature and a time sufficient to synthesize primary particles in the solvent and non-solvent, a rate of an interaction between the solvent and the non-solvent effecting a separation of the primary particles just before a gelation occurs, thereby forming a crosslinked copolymer network;
   (b) adding a near-critical fluid to a reactor containing the crosslinked copolymer network;
   (c) venting the reactor to allow a portion of the near-critical fluid to escape the reactor while maintaining a quantity of the near-critical fluid to totally immerse the crosslinked copolymer network;

(d) repeating process steps (b) and (c) as necessary until the solvent and non-solvent in the crosslinked copolymer network is removed and replaced with the near-critical fluid;

(e) increasing a reactor temperature above a critical-point value for the near-critical fluid thereby transforming the near-critical fluid into a supercritical fluid, yet below a temperature which might degrade the crosslinked copolymer network, for a sufficient period of time to effect a permeation of the voids in the crosslinked copolymer network; and (f) drying the crosslinked copolymer network by venting the supercritical fluid until an internal pressure in the reactor approximates an ambient pressure to permit collection of a microcellular crosslinked copolymer foam having a cell size which is less than 10 μm.

2. The process of claim 1 wherein the monomer is methyl methacrylate and the comonomer is ethyleneglycol dimethacrylate.

3. The process of claim 1 wherein the monomer is bisphenol-A and the comonomer is tetraethylpentamine.

4. The process of claim 1 wherein the near-critical liquid has a supercritical temperature below 200° C.

5. The process of claim 4 wherein the near-critical liquid is carbon dioxide.

6. The process of claim 1 wherein the solvent is a swelling agent for the polymer and miscible with the comonomer.

7. The process of claim 6 wherein the solvent is selected from the group consisting of toluene and methylisobutyl ketone.

8. The process of claim 1 wherein the non-solvent is compatible with the solvent and interacts during the polymerization to control a size of a void space in the microcellular crosslinked copolymer foam.

9. The process of claim 8 wherein the non-solvent is selected from the group consisting of methanol, ethanol, propanol, isopropanol, butanol, and heptane.

10. The process of claim 8 wherein a pore size is controlled by an affinity relationship between the polymer and the solvent, the pore size increasing as the affinity decreases.

11. The process of claim 1 wherein a polymerization reaction is selected from the group consisting of free-radical, condensation, anionic and cationic polymerizations.

12. The process of claim 2 wherein the ratio of monomer to comonomer is between 20:1 to 1:1.

13. The process of claim 2 wherein the ratio of diluent to monomer is between 10:1 and 1:3.

14. The process of claim 3 wherein the ratio of monomer to comonomer is between 10:1 to 1:1.

15. The process of claim 3 wherein the ratio of diluent to monomer is between 9:1 and 3:1.

16. The process of claim 3 wherein the microcellular crosslinked copolymer foam is open-celled.

17. A process for synthesizing a foam in a single reactor comprising the steps of:

(a) mixing a monomer which is capable of polymerizing with a comonomer capable of effecting a crosslinking reaction with the monomer in a near-critical fluid at a temperature below the boiling point of the near-critical fluid;

(b) pressurizing the reactor and increasing the temperature of the reactor to a point below a critical temperature of the near-critical fluid;

(c) polymerizing the monomer with the comonomer in the near-critical fluid for a time sufficient to effect a synthesis of primary particles in the near-critical fluid, a rate of an interaction between the near-critical fluid and the monomer and the comonomer effecting a separation the primary particles just before a gelation occurs, thereby forming a microcellular crosslinked copolymer network;

(d) drying the microcellular crosslinked copolymer network by raising the temperature to a point above the supercritical temperature of the near-critical fluid, thereby transforming the near-critical fluid into a supercritical fluid, yet below a temperature which might degrade the microcellular crosslinked copolymer network;

(e) venting the supercritical fluid from the reactor to permit collection of a microcellular crosslinked copolymer foam having a cell size which is less than 10 μm.

18. The process of claim 17 wherein the monomer is methyl methacrylate and the comonomer is ethyleneglycol dimethacrylate.

19. The process of claim 17 wherein the monomer is bisphenol-A and the comonomer is tetraethylpentamine.

20. The process of claim 17 wherein the near-critical liquid has a critical temperature which is below 200° C.

21. The process of claim 17 wherein the near-critical liquid is selected from the group consisting of freon and propane.

22. The process of claim 17 wherein a polymerization reaction is selected from the group consisting of free-radical, condensation, anionic and cationic polymerizations.

23. The process of claim 18 wherein the monomer to solvent ratio is between 20:1 and 1:1.

24. The process of claim 18 wherein the monomer to comonomer ratio is between 10:1 and 1:9.

25. The process of claim 19 wherein the monomer to solvent ratio is between 10:1 and 1:1.

26. The process of claim 19 wherein the monomer to comonomer ratio is between 9:1 and 3:1.

27. The process of claim 17 wherein the microcellular crosslinked copolymer foam is open-celled.

28. A process for synthesizing a microcellular polymer foam in a diluent comprising the steps of:

(a) polymerizing a multifunctional monomer with at least one primary and at least one secondary reaction site, capable of propagating a polymerization reaction with the primary reaction site, yet also capable of effecting a crosslinking reaction with the secondary reaction site in a solvent and a non-solvent at a temperature and a time sufficient to effect a synthesis of primary particles in the solvent and non-solvent, a rate of an interaction between the solvent and the non-solvent effecting a separation of the primary particles just before a gelation occurs, thereby forming a crosslinked network;

(b) adding a near-critical fluid to a reactor containing the crosslinked copolymer network;

(c) venting the reactor to allow a portion of the near-critical fluid to escape the reactor while maintaining a quantity of the near-critical fluid to totally immerse the crosslinked network;

(d) repeating process steps (b) and (c) until the solvent and the non-solvent in the crosslinked network is removed and replaced with the near-critical fluid;

(e) increasing a reactor temperature above a critical-point value for the near-critical fluid thereby transforming the near-critical fluid into a supercritical fluid, yet below a temperature which might degrade the crosslinked network, for a sufficient period of time to effect a permeation of the voids in the crosslinked network; and (f) venting the near-critical fluid until an internal pressure in the reactor approximates an ambient pressure to permit collection of a microcellular crosslinked homopolymer foam having a cell size which is less than 10 μm.

29. A process for synthesizing a microcellular polymer. foam in a supercritical fluid in a single reactor comprising the steps of:

(a) adding a multifunctional monomer with at least one primary and at least one secondary reaction site, capable of propagating a polymerization reaction with the primary reaction site, yet also capable of effecting a crosslinking reaction with the secondary reaction site in a near-critical fluid at a temperature below the boiling point of the near-critical fluid;

(b) pressurizing the reactor and increasing the temperature of the reactor to a point above the boiling point of the near-critical fluid yet below a critical temperature of the near-critical fluid;

(c) polymerizing the monomer in the near-critical fluid for a time sufficient to effect a synthesis of primary particles in the near-critical fluid, a rate of an interaction between the near-critical fluid and the monomer effecting a separation the primary particles just before a gelation occurs, thereby forming a microcellular crosslinked polymer network;

(d) drying the crosslinked network by raising the temperature to a point above a supercritical temperature of the near-critical fluid thereby transforming the near-critical fluid into a supercritical fluid, yet below a temperature which might degrade the microcellular crosslinked copolymer network;

(e) venting the supercritical fluid from the reactor to permit collection of a microcellular crosslinked homopolymer foam having a cell size which is less than 10 μm.

* * * * *